(12) United States Patent
Kawakami

(10) Patent No.: US 11,118,525 B2
(45) Date of Patent: Sep. 14, 2021

(54) FUEL INJECTION CONTROL DEVICE

(71) Applicant: DENSO CORPORATION, Kariya (JP)

(72) Inventor: Daisuke Kawakami, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 17/065,121

(22) Filed: Oct. 7, 2020

(65) Prior Publication Data
US 2021/0108588 A1 Apr. 15, 2021

(30) Foreign Application Priority Data
Oct. 11, 2019 (JP) .............. JP2019-188081

(51) Int. Cl.
*F02D 41/20* (2006.01)
*F02D 41/40* (2006.01)
(52) U.S. Cl.
CPC ............. *F02D 41/20* (2013.01); *F02D 41/40* (2013.01); *F02D 2041/2003* (2013.01); *F02D 2041/2055* (2013.01); *F02D 2041/2058* (2013.01)
(58) Field of Classification Search
CPC .. F02D 41/20; F02D 41/40; F02D 2041/2058; F02D 2041/2003; F02D 2041/2055
See application file for complete search history.

(56) References Cited

U.S. PATENT DOCUMENTS

| | | | |
|---|---|---|---|
| 2009/0183714 A1 | 7/2009 | Mayuzumi | |
| 2012/0067329 A1* | 3/2012 | Bunni | F02D 41/20 |
| | | | 123/490 |
| 2016/0240299 A1* | 8/2016 | Wakai | F02D 41/20 |
| 2017/0328293 A1 | 11/2017 | Yamanaka | |
| 2018/0320620 A1* | 11/2018 | Satake | F02D 41/402 |
| 2020/0088122 A1* | 3/2020 | Kusakabe | F02D 41/40 |

FOREIGN PATENT DOCUMENTS

JP 2019-019778 A 2/2019

* cited by examiner

*Primary Examiner* — George C Jin
(74) *Attorney, Agent, or Firm* — Posz Law Group, PLC

(57) ABSTRACT

A fuel injection control device includes an injection valve drive circuit that drives a plurality of injection valves, a booster circuit that generates a boosted voltage supplied to the injection valve drive circuit; and a fuel pump drive circuit that drives a fuel pump for compressing fuel of an internal combustion engine. The fuel pump drive circuit is configured to, when driving the fuel pump, regenerate energy into the booster circuit. The injection valve drive circuit is configured to, during a non-drive period of the injection valves or during a period in which the fuel pump is intermittently driven continuously, perform a non-valve opening energization on at least one of the plurality of injection valves.

7 Claims, 7 Drawing Sheets

FUEL INJECTION CONTROL DEVICE

CROSS REFERENCE TO RELATED APPLICATION

The present application claims the benefit of priority from Japanese Patent Application No. 2019-188081 filed on Oct. 11, 2019. The entire disclosure of the above application is incorporated herein by reference.

TECHNICAL FIELD

The present disclosure relates to a fuel injection control device.

BACKGROUND

A fuel injection control device may include a booster circuit for providing a boosted voltage in order to drive various components.

SUMMARY

In one aspect of the present disclosure, a fuel injection control device includes an injection valve drive circuit that drives a plurality of injection valves, a booster circuit that generates a boosted voltage supplied to the injection valve drive circuit; and a fuel pump drive circuit that drives a fuel pump for compressing fuel of an internal combustion engine. The fuel pump drive circuit is configured to, when driving the fuel pump, regenerate energy into the booster circuit. The injection valve drive circuit is configured to, during a non-drive period of the injection valves or during a period in which the fuel pump is intermittently driven continuously, perform a non-valve opening energization on at least one of the plurality of injection valves.

The disclosed aspects in this specification adopt different technical solutions from each other in order to achieve their respective objectives. Reference numerals in parentheses described herein show corresponding relationships between different embodiments and are not intended to limit technical scopes. The objects, features, and advantages disclosed in this specification will become apparent by referring to following detailed descriptions and accompanying drawings.

DETAILED DESCRIPTION

Figure 1:
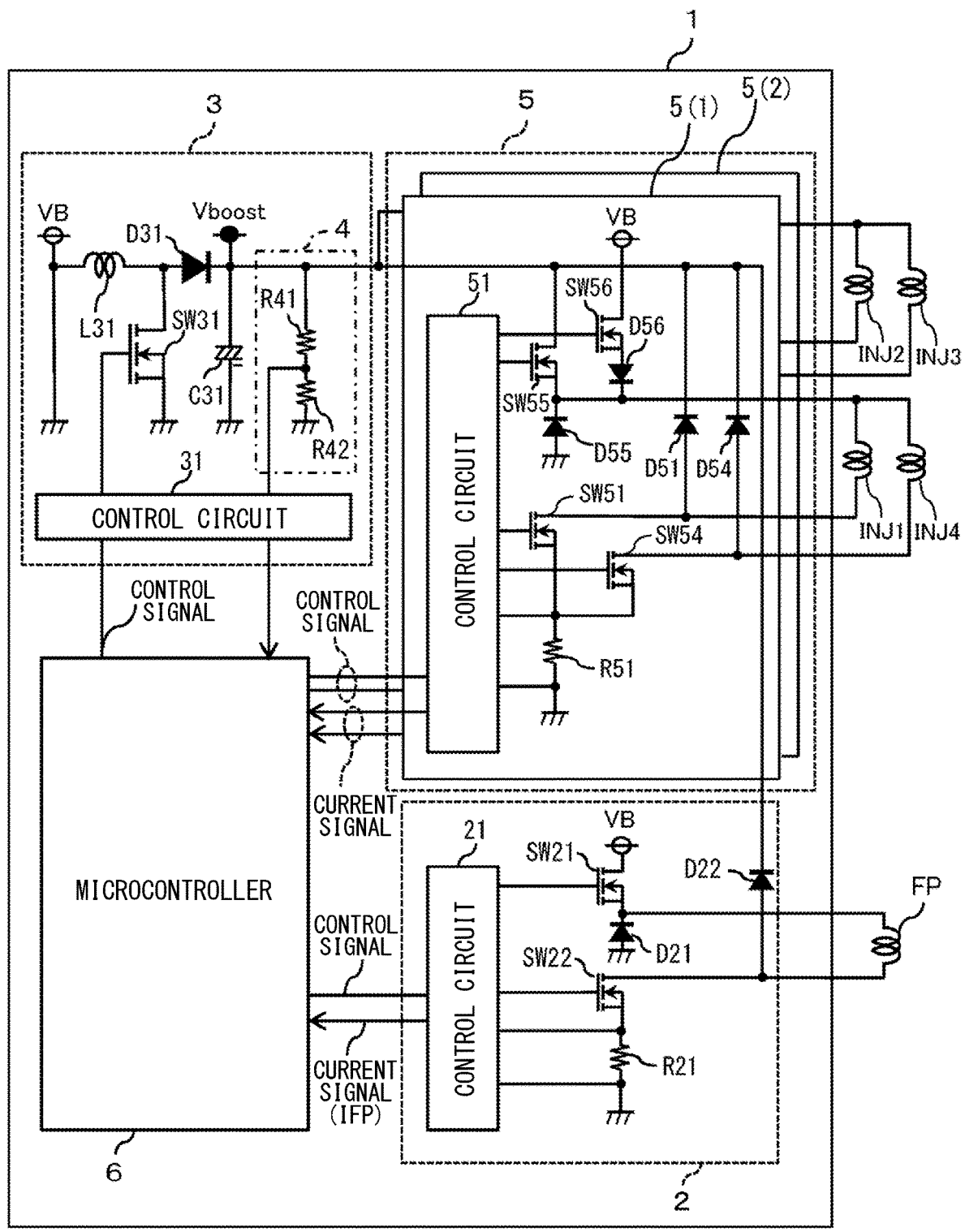
FIG. 1 is a circuit diagram showing a schematic configuration example of a fuel injection control device.

Embodiments will be described with reference to drawings. In some embodiments, parts that are functionally and/or structurally corresponding to each other and/or associated with each other are given the same reference numerals, or reference numerals with different hundred digit or more digits. For corresponding parts and/or associated parts, additional explanations can be made to the description of other embodiments.

First Embodiment

A fuel injection control device 1 shown in FIG. 1 includes a fuel pump drive circuit 2, a booster circuit 3, an injection valve drive circuit 5, and a microcontroller 6. The fuel pump drive circuit 2, the booster circuit 3, and the injection valve drive circuit 5 are controlled by control signals from the microcontroller 6. The fuel pump drive circuit 2 is connected to a fuel pump FP that compresses fuel of an internal combustion engine, and controls the energization of the fuel pump FP. The injection valve drive circuit 5 controls injection valves (i.e., injectors), and is connected to four injection valves INJ1 to INJ4 in the first embodiment.

Further, in the first embodiment, the injection valve drive circuit 5 is composed of two separate circuit systems, and two injection valves are connected to each circuit system. The configuration of the injection valve drive circuit 5 will be described in detail later. The number of injection valves connected to the injection valve drive circuit 5 is not limited to four. For example, the number of injection valves may be six or eight. In that case, the injection valve drive circuit 5 may include three or four system circuit systems to each of which two injection valves are connected.

Further, in the following description, when it is not necessary to specify a particular one of the injection valves INJ1 to INJ4, they are simply referred to as injection valves INJ.

The fuel pump drive circuit 2 includes switches SW21 and SW22, diodes D21 and D22, a resistor R21, and a control circuit 21. The fuel pump drive circuit 2 controls the fuel pump FP based on a control signal from the microcontroller 6 to the control circuit 21. The switches SW21 and SW22 are n-channel field effect transistors.

The control circuit 21 controls ON/OFF of the switches SW21 and SW22 based on a control signal from the microcontroller 6 during a fuel pump drive period. The control circuit 21 supplies a battery voltage VB to the fuel pump FP by turning on the switches SW21 and SW22. The control circuit 21 also drives the fuel pump FP by energizing the solenoid coil of the fuel pump FP.

The diode D21 causes a surge current to flow back from the ground to the solenoid coil of the fuel pump FP when the switches SW21 and SW22 are turned off after driving the fuel pump. Energy generated when the fuel pump is driven is regenerated through the diode D22 to a capacitor C31 provided in the booster circuit 3 described later.

The resistor R21 is a resistor for detecting the value of the current flowing through the solenoid coil of the fuel pump FP. The control circuit 21 measures the value of the current flowing through the solenoid coil of the fuel pump FP based on the voltage values on the upper and lower sides of the resistor R21 and the resistance value of the resistor R21. The measured current value is sent from the control circuit 21 to the microcontroller 6 as a current notification signal (IFP).

The booster circuit 3 boosts the battery voltage VB to generate a boosted voltage Vboost. The booster circuit 3 includes a coil L31, a switch SW31, a diode D31, a capacitor C31, a control circuit 31, and a boosted voltage monitor circuit 4. The switch SW31 is an n-channel field effect transistor. The coil L31 and the switch SW31 are connected in series between the battery voltage VB and ground. The anode of the diode D31 is connected to the connection point between the coil L31 and the drain terminal of the switch SW31. Further, the capacitor C31 is connected to the cathode of the diode D31. Further, the control circuit 31 is connected to the gate terminal of the switch SW31, and turns the switch SW31 ON/OFF according to a control signal from the microcontroller 6.

The control circuit 31 charges the capacitor C31 by repeatedly switching the switch SW31 on and off. Specifically, when the switch SW31 is turned on, a current flows through the path of the coil L31 and the switch SW31. After that, when the switch SW31 is turned off, a counter electromotive force is generated in the coil L31, which charges the capacitor C31. The voltage charged in the capacitor C31 is boosted by the control circuit 31 repeatedly switching the switch SW31 on and off. As a result, the boosted voltage Vboost accumulated in the capacitor C31 of the booster circuit 3 is supplied to the injection valve drive circuit 5.

The boosted voltage monitor circuit 4 includes resistors R41 and R42. The boost voltage Vboost is divided by the resistors R41 and R42, and the divided value is sent to the microcontroller 6 via the control circuit 31 and is monitored by the microcontroller 6 to measure the voltage value of the boosted voltage Vboost.

The injection valve drive circuit 5 uses the boosted voltage Vboost and the battery voltage VB to drive the injection valves INJ. In the injection valves INJ, when the built-in solenoid coil is energized, the solenoid coil moves the valve body to the open state, and the injection valve is opened. When the energization of the solenoid coil is stopped, the valve body returns to the closed state. As a result, the fuel injection valve returns to a closed state and the fuel injection is stopped. In addition, in order to open the injection valve INJ, it is necessary to apply, to the solenoid coil, a current equal to or higher than a particular value necessary for opening the valve.

Figure 2:
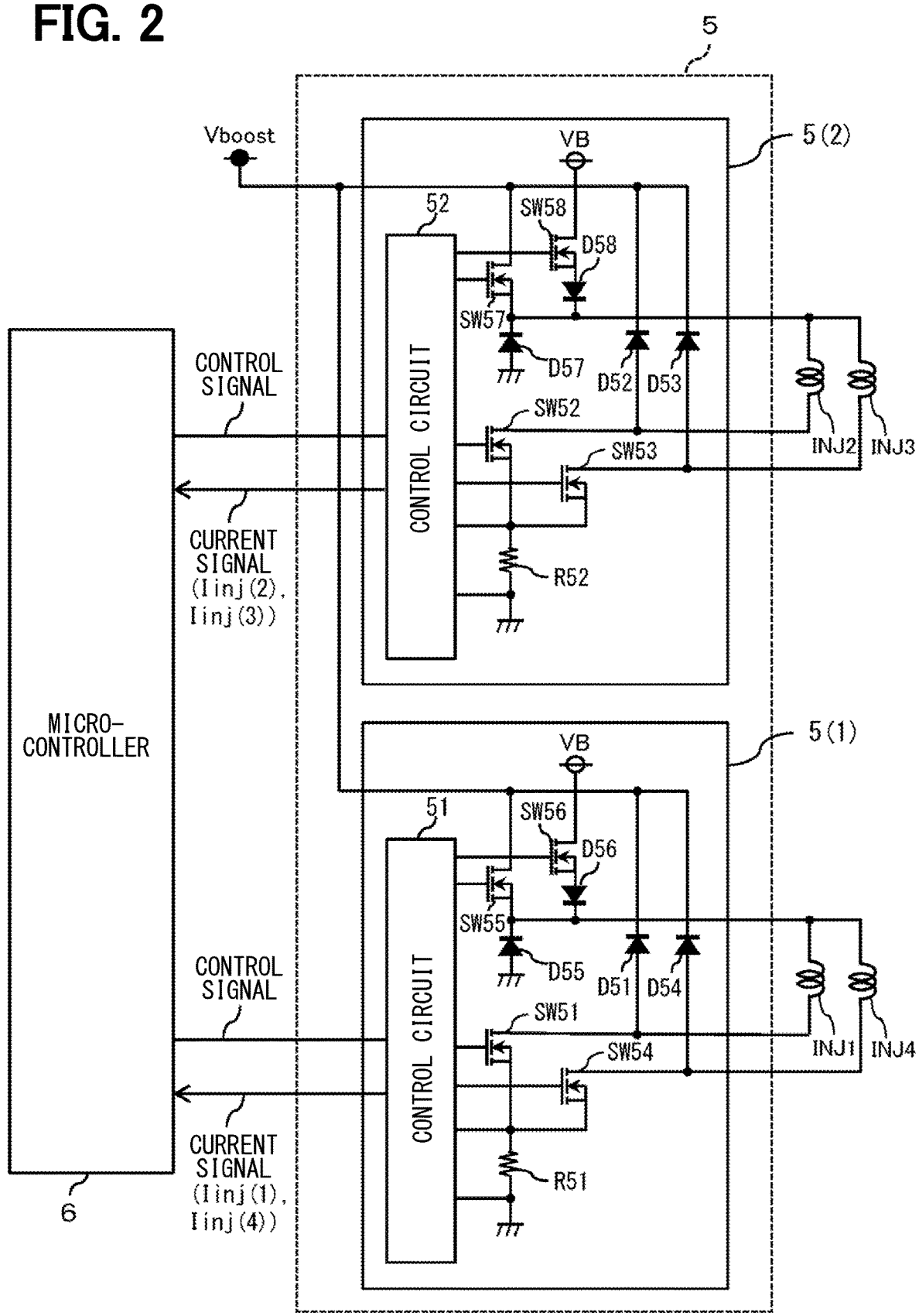
FIG. 2 is a circuit diagram showing a schematic configuration example of an injection valve drive circuit.

FIG. 2 shows the internal configuration of the injection valve drive circuit 5. The injection valve drive circuit 5 is composed of two separate circuit systems, a first system circuit 5(1) and a second system circuit 5(2). Injection valves INJ1 and INJ4 are connected to the first system circuit 5(1). Further, injection valves INJ2 and INJ3 are connected to the second system circuit 5(2).

The first system circuit 5(1) includes switches SW51, SW54 to SW56, diodes D51, D54 to D56, a resistor R51, and a control circuit 51. The second system circuit 5(2) includes switches SW52, SW53, SW57, SW58, diodes D52, D53, D57, D58, a resistor R52, and a control circuit 52.

The switches SW51 to SW58 are n-channel field effect transistors. The control circuits 51 and 52 control ON/OFF of the switches SW51 to SW58 based on a control signal from the microcontroller 6. The switches SW51 to SW54 are connected to respective ones of the injection valves INJ1 to INJ4. When any one of the switches SW51 to SW54 is turned on, a corresponding one of the injection valves INJ1 to INJ4 to is selected as a drive target.

The switches SW55 and SW57 are switches for supplying the boosted voltage Vboost to the injection valves INJ. The switches SW56 and SW58 are switches for supplying the battery voltage VB to the injection valves INJ. By turning on the switches SW55 or SW56, voltage is supplied to the injection valve selected by the switches SW51 and SW54 among the injection valves INJ1 and INJ4. Similarly, by turning on the switches SW57 or SW58, voltage is supplied to the injection valve selected by the switches SW52 and SW53 among the injection valves INJ2 and INJ3.

The diode D55 circulates a current from the ground to the injection valve INJ when the switch SW55 is turned off. At the same time, the diode D57 circulates a current from the ground to the injection valve INJ when the switch SW57 is turned off. The diodes D56 and D58 are diodes for reverse current prevention. When the switches SW51 to SW54 are turned off, the energy generated in the injection valves INJ1 to INJ4 is regenerated in the capacitor C31 of the booster circuit 3 via the diodes D51 to D54.

The resistor R51 is a resistor for detecting the value of the current flowing through the injection valve INJ1 or the injection valve INJ4. The value of the current flowing through the injection valve INJ1 or INJ4 selected by the switch SW51 or SW54 is detected by the resistor R51. Specifically, the control circuit 51 measures the value of the current flowing through the injection valve INJ based on the voltage values on the upper and lower sides of the resistor R51 and the resistance value of the resistor R51. The measured current value is sent from the control circuit 51 to the microcontroller 6 as a current notification signal (Iinj(1), (4)). The resistor R52 is a resistor for detecting the value of the current flowing through the injection valve INJ2 or the injection valve INJ3. The method of detecting the current is similar to that of the case of the resistor R51 described above, and thus the description thereof will be omitted.

The operation of the first embodiment will be described with reference to the timing chart shown in FIG. 3. During a stop-drive period of the injection valves, and also during a period in which the fuel pump is intermittently driven, the injection valve drive circuit 5 energizes at least one of the injection valves INJ so as not to open the injection valve INJ. Here, the "stop-drive period" of the injection valves corresponds to, for example, a cranking period of the engine, a fuel cut period accompanying deceleration of the engine, and the like. Further, the driving of the injection valves is also stopped when the valve of the fuel pump is locked up due to foreign matter being caught in the fuel pump or when the fuel pump has a discharge failure due to low fuel pressure. That is, the "stop-drive period" of the injection valves includes when the injection valves are stopped due to these types of abnormalities. The period T1 to T18 shown in FIG. 3 is a period in which the fuel pump FP is driven intermittently, and corresponds to a stop-drive period of the injection valves INJ.

Figure 3:
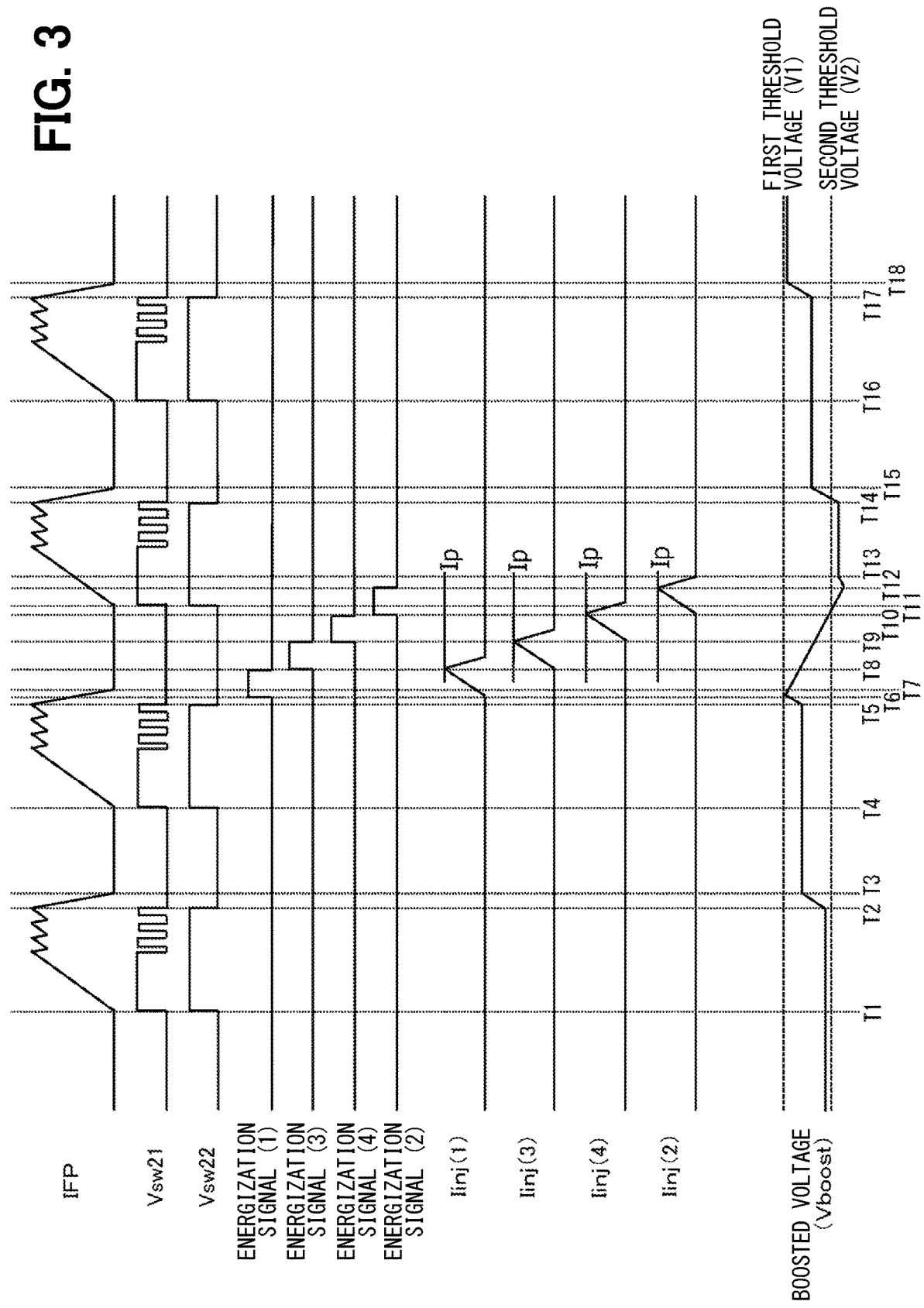
FIG. 3 is a timing chart showing an operation example of a fuel injection control device.

In the example of FIG. 3, the fuel pump FP is driven for four cycles in the periods T1 to T18. IFP shown in FIG. 3 is the current flowing through the solenoid coil of the flow control valve of the fuel pump FP. The flow control valve controls the amount of fuel flowing into the pressurizing chamber in the fuel pump FP. The flow control valve is fully opened when the IFP is zero. As the IFP increases and the solenoid coil is excited, the flow control valve is biased toward the closed state.

When the injection valves INJ are driven, one of the injection valves INJ is opened and the high-pressure fuel is discharged from the fuel pump FP each time the driving of the fuel pump FP is completed. The high-pressure fuel discharged from the fuel pump FP is injected into the cylinder of the engine through the opened injection valve INJ. Note that, here, the flow control valve of the fuel pump FP is assumed to be fully opened in the state where no current flows through the solenoid coil, but the configuration of the fuel pump FP is not limited to this.

In FIG. 3, Vsw21 and Vsw22 are voltages applied to the switches SW21 and SW22, respectively. When the voltage Vsw21 becomes high level, the switch SW21 is turned on, and when the voltage Vsw21 becomes low level, the switch SW21 is turned off. When the voltage Vsw22 becomes high level, the switch SW22 is turned on, and when the voltage Vsw22 becomes low level, the switch SW22 is turned off.

The energization signals (1) to (4) are control signals supplied from the microcontroller 6 to the control circuits 51 and 52 for controlling the energization of the injection valves INJ1 to INJ4. For example, when the energization signal (1) becomes high level, the control circuit 51 turns on the switch SW51, the switch SW55, and the switch SW56 to energize the injection valve INJ1. Iinj (1) to (4) are values of currents flowing through the injection valves INJ1 to INJ4.

At time T1, the switches SW21 and SW22 of the fuel pump drive circuit 2 are turned on, and the current IFP flows through the solenoid coil of the fuel pump FP during the period T1-T2. At time T2, the switches SW21 and SW22 are turned off, and the current IFP flowing through the solenoid coil decreases. Here, the period T1-T2, i.e. the period in which the switch SW22 is turned on, is referred to as a driving period of the fuel pump FP.

When the driving period of the fuel pump FP ends, the energy stored in the solenoid coil of the fuel pump FP is regenerated in the capacitor C31 of the booster circuit 3 via the diode D22. As a result, the boosted voltage Vboost rises (period T2-T3).

When driving and opening the injection valves INJ, the injection valve drive circuit 5 uses the boost voltage Vboost. Therefore, the electric charge of the capacitor C31 of the booster circuit 3 is discharged. Therefore, if the injection valves INJ were to be opened, the boosted voltage Vboost would decrease during the period T3-T4 (not shown). However, when the driving of the injection valves is stopped, such as during fuel cut, the energization for opening the injection valves INJ is not performed, so the charge of the capacitor C31 is not discharged. In this case, the boosted voltage Vboost does not decrease and remains constant as shown in the period T3-T4 in FIG. 3.

Therefore, the boosted voltage Vboost increases during the stop-drive periods of the injection valves and during the periods in which the fuel pump drive circuit 2 drives the fuel pump FP intermittently.

In the first embodiment, when the boosted voltage Vboost reaches the first threshold voltage V1, the injection valve drive circuit 5 energizes the injection valves INJ to such an extent that the injection valves INJ do not open.

In order to distinguish the energization of the injection valves INJ at a level which does not open the injection valves INJ as compared to the typical energization for opening the injection valves INJ, hereinafter, this energization process will be referred to as a "non-valve opening energization". The first threshold voltage V1 is lower than a maximum upper limit value (component breakdown voltage) of a voltage that can be applied to the fuel injection control device 1, and is higher than a voltage reached by driving the fuel pump once from a reference voltage. The reference voltage can be, for example, the battery voltage VB.

During the time T3 to T4 in FIG. 3, the boosted voltage Vboost does not reach the first threshold voltage V1, and therefore the non-valve opening energization by the injection valve drive circuit 5 is not performed.

In the period T5-T7, similar to the above, energy regeneration is performed by driving the fuel pump FP started at the time T4, and the boosted voltage Vboost rises. In the example shown in FIG. 3, the boosted voltage Vboost reaches the first threshold voltage V1 at time T6 within the period T5-T7. As a result, the microcontroller 6 sets the energization signal (1) to the control circuit 51 to the high level.

The control circuit 51 turns on the switch SW51, the switch SW55, and the switch SW56 based on the energization signal (1). As a result, non-valve opening energization from the injection valve drive circuit 5 to the injection valve INJ1 is started (period T6-T8). The non-valve opening energization of the injection valve INJ1 reduces the voltage value of the boost voltage Vboost.

When the current Iinj(1) of the injection valve INJ1 reaches the peak current Ip (time T8), the microcontroller 6 sends to the control circuit 51 a control signal for ending the non-valve opening energization of the injection valve INJ1. Specifically, the microcontroller 6 sets the energization signal (1) to the control circuit 51 to the low level.

As a result, the control circuit 51 turns off the switch SW51, the switch SW55, and the switch SW56, and the non-valve opening energization of the injection valve INJ1 ends. The value of the current Iinj of the injection valves INJ is notified to the microcontroller 6 via the control circuits 51 and 52 of the injection valve drive circuit 5. The peak current Ip is a value lower than the current value at which the injection valve INJ opens. In other words, the peak current Ip is set to a value at which the injection valve INJ does not open.

At time T8, the boosted voltage Vboost does not fall below the second threshold voltage V2, so the next non-valve opening energization to the injection valve INJ3 is performed.

Specifically, the microcontroller 6 sets the energization signal (3) to the control circuit 52 to the high level. Based on the energization signal (3), the control circuit 52 turns on the switch SW53, the switch SW57, and the switch SW58. In this manner, the switches SW51 to SW54 are sequentially selected as the target of the non-valve opening energization.

In the example shown in FIG. 3, the non-valve opening energization target is sequentially selected in the order of the injection valve INJ1, the injection valve INJ3, the injection valve INJ4, and then the injection valve INJ2. Further, the non-valve opening energization to the injection valves INJ is repeated until the value of the boosted voltage Vboost falls below the value of the second threshold voltage V2.

The second threshold voltage V2 is set to a value lower than the first threshold voltage V1. Further, the lower limit of the second threshold voltage V2 is preferably set to a value slightly lower than the above-mentioned reference voltage in view of the relationship with the above-mentioned first threshold voltage V1.

In the operation example shown in FIG. 3, the boosted voltage Vboost falls below the second threshold voltage V2 at time T10. When the current Iinj(2) of the injection valve INJ2 reaches the peak current Ip due to non-valve opening energization of the injection valve INJ2 (time T12), the microcontroller 6 sets the energization signal (2) to the control circuit 52 to the low level. Based on the energization signal (2), the control circuit 52 turns off the switch SW52, the switch SW57, and the switch SW58, and the non-valve opening energization to the injection valve INJ2 ends. At this time, since the boosted voltage Vboost is lower than the second threshold voltage V2, the non-valve opening energization of the injection valves INJ ends.

After that, the value of the boosted voltage Vboost rises due to the energy regeneration performed in the period from T14 to T15 and the period from T17 to T18. When the boosted voltage Vboost reaches the first threshold voltage V1 again, the non-valve opening energization of the injection valve INJ1 is performed (not shown in FIG. 3) as described above. This is because the non-valve opening energization to the injection valve INJ2 has ended at the time T13, and therefore, according to the selection order previously described, the injection valve INJ1 is once again selected as the first injection valve.

Figure 4:
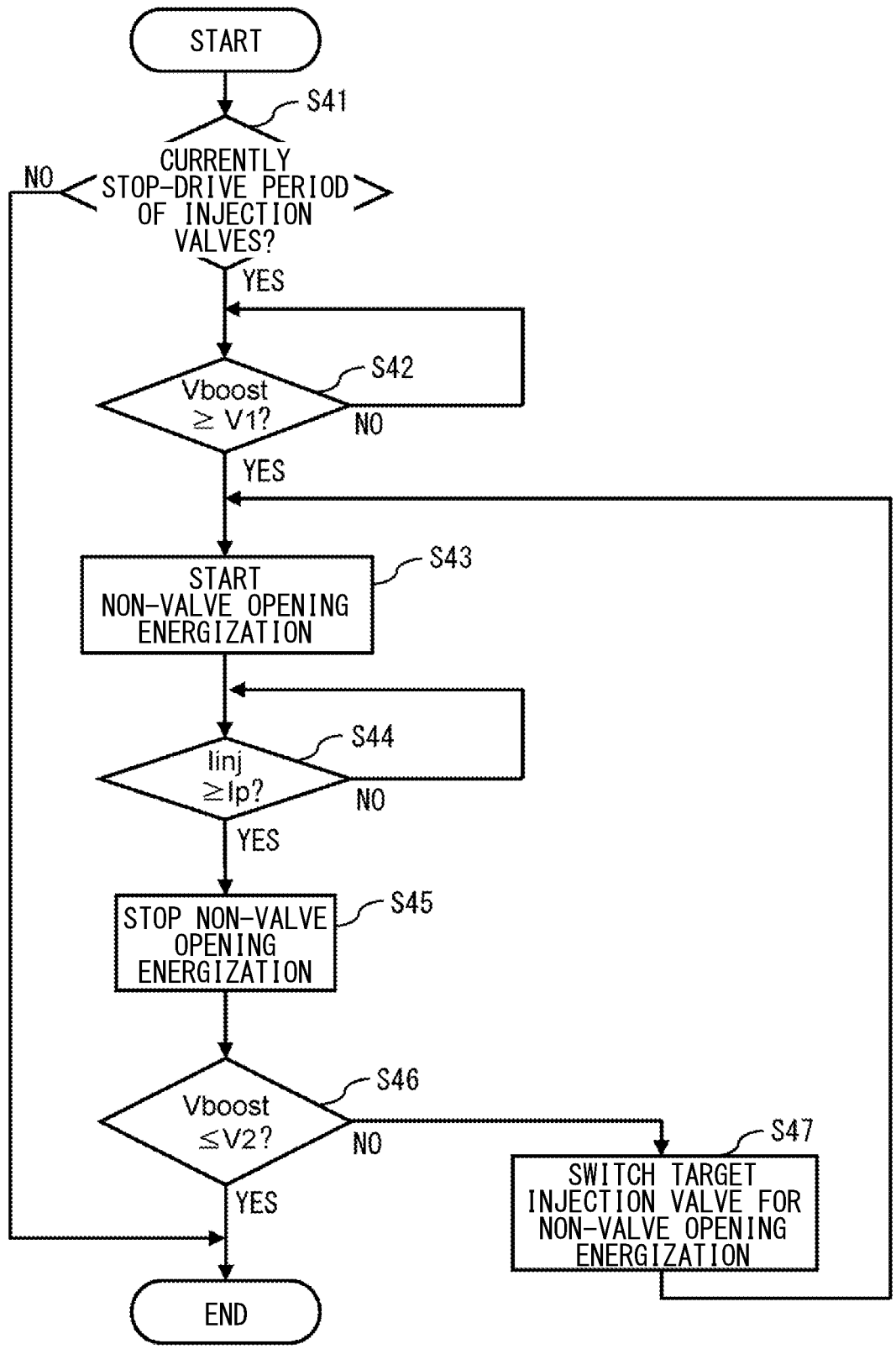
FIG. 4 is a flowchart showing a control process example for a fuel injection control device.

Next, a control process of the first embodiment will be described using the flowchart shown in FIG. 4. The control process in FIG. 4 is executed by the microcontroller 6. In step S41, the microcontroller 6 determines whether currently is during the injection valve stop-drive period.

When outside of the injection valve stop-drive period, the capacitor C31 is discharged due to energization for opening the injection valves INJ, so that the boosted voltage Vboost does not exceed the breakdown voltage of the device. Therefore, in the case of NO in step S41, the control flow shown in FIG. 4 ends. On the other hand, if YES in step S41, the capacitor C31 of the booster circuit 3 is discharged by the processing in step S42 and subsequent steps.

In step S42, the microcontroller 6 determines whether or not the voltage value of the boost voltage Vboost acquired from the boosted voltage monitor circuit 4 is equal to or higher than the first threshold voltage V1. If the voltage value of the boosted voltage Vboost has not reached the first threshold voltage V1, it is not necessary to discharge the voltage of the capacitor C31. Therefore, the determination in step S42 is repeated until the boosted voltage Vboost becomes equal to or higher than the first threshold voltage V1.

If the result of step S42 is YES, the microcontroller 6 instructs the start of non-valve opening energization to any one of the injection valves INJ1 to INJ4 by a control signal to the control circuits 51 and 52 in step S43.

The control circuits 51 and 52 control the switches SW51 to SW58 based on control signals from the microcontroller 6 to the control circuits 51 and 52. That is, the control circuits 51 and 52 turn on any one of the switches SW51 to SW54 corresponding to the injection valve that is the target for the non-valve opening energization. Further, the control circuits 51 and 52 turn on the switch SW55 and the switch SW56, or the switch SW57 and the switch SW58. As a result, non-valve opening energization is performed on the injection valves INJ.

Then, in step S44, it is determined whether or not the current Iinj flowing through the injection valve that is the target of the non-valve opening energization is equal to or greater than the peak current Ip. That is, the non-valve opening energization is continued until the current Iinj reaches the peak current Ip. Here, the value of the current Iinj is sent to the microcontroller 6 via the control circuits 51 and 52 of the injection valve drive circuit 5.

If the decision result in the step S44 is YES, the microcontroller 6 instructs the stop of the non-valve opening energization by sending a control signal to the control circuits 51 and 52 in step S45. Based on this control signal, the control circuits 51 and 52 turn off all the switches SW51 to SW58, so that the non-valve opening energization to the injection valves INJ is stopped.

After that, in step S46, the microcontroller 6 determines whether or not the boosted voltage Vboost acquired from the boosted voltage monitor circuit 4 is equal to or lower than the second threshold voltage V2. If the decision result in the step S46 is YES, the capacitor C31 is sufficiently discharged, and the process ends.

If the determination result in step S46 is NO, in step S47, the microcontroller 6 switches to the next injection valve INJ to be the target for the non-valve opening energization.

Then, the control process of the microcontroller 6 returns to step S43. In step S43 again, the microcontroller 6 instructs the start of non-valve opening energization to any one of the injection valves INJ1 to INJ4 by a control signal to the control circuits 51 and 52. Then, the control circuits 51 and 52 control the switches SW51 to SW58 based on control signals from the microcontroller 6 to the control circuits 51 and 52, and the non-valve opening energization is performed on the injection valves INJ.

As described above, the fuel injection control device 1 performs the non-valve opening energization on the injection valves INJ during the stop-drive period of the injection valves INJ and during the periods in which the fuel pump FP is intermittently driven continuously. As a result, the voltage generated due to the driving of the fuel pump and accumulated in the capacitor C31 of the booster circuit 3 can be discharged, and it is possible to prevent malfunctions caused by the boosted voltage Vboost being excessively boosted.

Further, the injection valve drive circuit 5 starts non-valve opening energization when the boosted voltage Vboost becomes equal to or higher than the first threshold voltage V1. Further, the injection valve drive circuit 5 stops the non-valve opening energization when the boosted voltage Vboost becomes equal to or lower than the second threshold voltage V2.

In this way, by monitoring the boosted voltage Vboost and controlling the start timing of the non-valve opening energization according to the value of the boosted voltage Vboost, it is possible to reliably prevent the boosted voltage Vboost from being excessively boosted. Similarly, since the timing of stopping the non-valve opening energization is also controlled based on the monitored value of the boost voltage Vboost, excessive discharge due to the non-valve opening energization can be prevented.

In the above-mentioned example, the case where the injection valves INJ1 to INJ4 are sequentially switched to perform non-valve opening energization is shown. However, various modifications are possible as long as the non-valve opening energization is performed on at least one of the injection valves INJ1 to INJ4. For example, the non-valve opening energization may be repeatedly performed on only one of the injection valves INJ, as long as the boosted voltage Vboost can be prevented from excessively rising. In addition, the control circuit can be simplified by reducing the number of injection valves that are targets for the non-valve opening energization.

On the other hand, as described above, the injection valves INJ1 to INJ4 may be sequentially switched to be the target of the non-valve opening energization. In this case, the heat generated in the switches SW51 to SW54 and the diodes D51 to D54 can be dispersed when there are numerous current-carrying targets as compared with the case where only a specific injection valve is the target of the non-valve opening energization.

Further, in the first embodiment, the non-valve opening energization is stopped when the current value of the non-valve opening energization of the injection valves INJ reaches the peak current Ip. By setting the peak current Ip to a value lower than the current value at which the injection valves INJ open, it is possible to avoid unintentionally opening the injection valves INJ.

The determination for when to stop the non-valve opening energization is not limited to the determination based on whether or not the current Iinj of the injection valve INJ has reached the peak current Ip. For example, a configuration may be employed in which a timer that measures the elapsed time from the start of the non-valve opening energization is provided, and the non-valve opening energization may be stopped when a predetermined amount of time has elapsed. In this case, the current Iinj does not have to be measured, so that the control process can be easily performed as compared with the case where the stop timing of the non-valve opening energization is determined based on the current Iinj of the injection valves INJ.

Second Embodiment

A second embodiment of the present disclosure will be described as follows. Note that, in the following description, when the same reference numeral is used as in the first embodiment, the same configuration as that of the first embodiment is specified, and the preceding description is referred to unless otherwise specified. In the second embodiment, the non-valve opening energization is started by detecting the end of driving of the fuel pump FP as a trigger. In this respect, the second embodiment is different from the first embodiment in which the start of the non-valve opening energization is controlled by measuring the value of the boost voltage Vboost by the boosted voltage monitor circuit 4.

The operation of the second embodiment will be described with reference to the timing chart shown in FIG. 5. In the period T51-T520 shown in FIG. 5, the driving of the injection valves INJ is stopped, but the intermittent driving of the fuel pump FP is continuously performed. At time T51, the switches SW21 and SW22 of the fuel pump drive circuit 2 are turned on, and the current IFP flows through the solenoid coil of the fuel pump FP during the period T51-T52. At time T52, the switches SW21 and SW22 are turned off, and the current IFP flowing through the solenoid coil decreases. That is, the period T51-T52 is the driving period of the fuel pump FP.

When the driving period of the fuel pump FP is completed at time T52, the energy stored in the solenoid coil is regenerated in the capacitor C31 via the diode D22. As a result, the boosted voltage Vboost rises (period T52-T53). At time T53, the boosted voltage Vboost has not reached the breakdown voltage of the device.

After one driving period of the fuel pump FP is completed (T52), the microcontroller 6 sets the energization signal (1) to the control circuit 51 to the high level at the time point (T54). That is, the microcontroller 6 sets Vsw22 to low level and then sets the energization signal (1) to high level. The control circuit 51 turns on the switch SW51, the switch SW55, and the switch SW56 based on the energization signal (1).

As a result, non-valve opening energization to the injection valve INJ1 is started. Due to the non-valve opening energization of the injection valve INJ1, the boost voltage Vboost decreases. At time T55, when the current Iinj of the injection valve INJ1 reaches the peak current Ip, the microcontroller 6 sets the energization signal (1) to low level. When the energization signal (1) becomes low level, the control circuit 51 turns off the switch SW51, the switch SW55, and the switch SW56. As a result, non-valve opening energization to the injection valve INJ1 ends.

Figure 5:
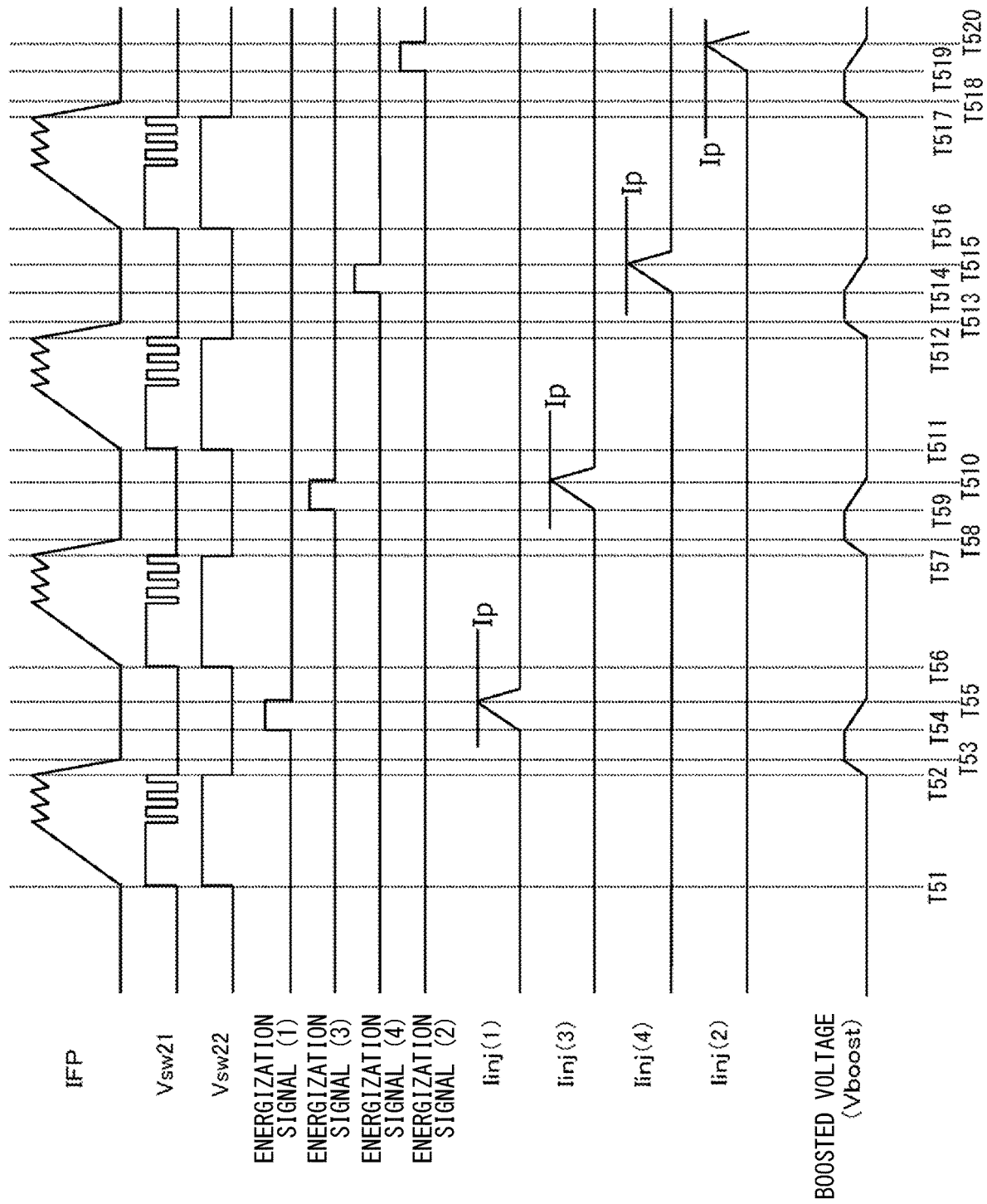
FIG. 5 is a timing chart showing an operation example of a fuel injection control device.

Thereafter, in the example shown in FIG. 5, during the period T56-T510, the period T511-T515, and the period T516-T520, the driving of the fuel pump and the non-valve opening energization are repeatedly performed. In the example shown in FIG. 5, the non-valve opening energization is performed by sequentially switching the injection valves INJ1 to INJ4.

Figure 6:
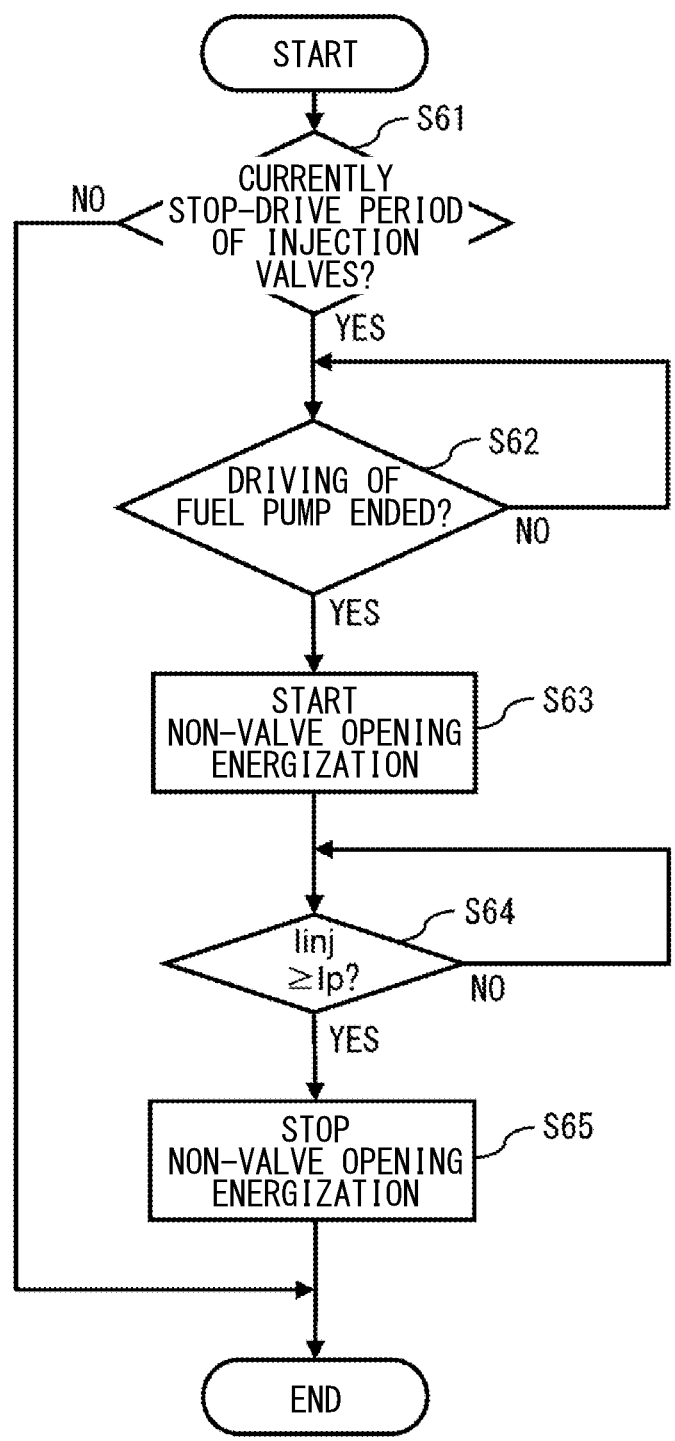
FIG. 6 is a flowchart showing a control process example of a fuel injection control device.

Next, the control process of the second embodiment will be described using the flowchart shown in FIG. 6. The control flow in FIG. 6 is executed by the microcontroller 6. First, in step S61, the microcontroller 6 determines whether currently is during the injection valve stop-drive period.

When outside of the injection valve stop-drive period, the capacitor C31 of the booster circuit 3 is discharged due to energization for opening the injection valves INJ, so there is no concern of the boosted voltage Vboost exceeding the breakdown voltage.

Therefore, in the case of NO in step S61, the control flow shown in FIG. 6 ends. On the other hand, if YES is determined in step S61, the voltage of the capacitor C31 of the booster circuit 3 is discharged by the processing in step S62 and subsequent steps.

In step S62, the microcontroller 6 waits for one drive cycle of the fuel pump FP by the fuel pump drive circuit 2 to be completed. When the driving of the fuel pump FP ends (YES in step S62), the microcontroller 6 advances the process to step S63. In step S63, the microcontroller 6 instructs the start of non-valve opening energization to any one of the injection valves INJ1 to INJ4 by a control signal to the control circuits 51 and 52.

The control circuits 51 and 52 control the switches SW51 to SW58 based on the control signal from the microcontroller 6. That is, the control circuits 51 and 52 turn on any one of the switches SW51 to SW54 corresponding to the injection valve that is the target for the non-valve opening energization. Further, the control circuits 51 and 52 turn on the switch SW55 and the switch SW56, or the switch SW57 and the switch SW58. As a result, non-valve opening energization is performed on the injection valves INJ.

Then, in step S64, the microcontroller 6 determines whether or not the current Iinj flowing through the injection valve that is the target of the non-valve opening energization is equal to or greater than the peak current Ip. That is, the non-valve opening energization is performed until the current Iinj reaches the peak current Ip. Here, the value of the current Iinj is sent to the microcontroller 6 via the control circuits 51 and 52 of the injection valve drive circuit 5.

If the determination result in the step S64 is YES, the microcontroller 6 sends a control signal instructing the control circuits 51 and 52 to stop the non-valve opening energization (step S65). As a result, the control circuits 51 and 52 turn off all the switches SW51 to SW58, so that the non-valve opening energization to the injection valves INJ is stopped.

As described above, the fuel injection control device 1 according to the second embodiment starts non-valve opening energization by using, as a trigger, the completion of one driving cycle of the fuel pump FP by the fuel pump drive circuit 2. In this case, the end of the driving of the fuel pump FP can be determined from the control information of the fuel pump drive circuit 2. That is, compared with the first embodiment, the second embodiment does not need to compare the boost voltage Vboost with the first threshold voltage V1 in order to determine the start timing of the non-valve opening energization. Thereby, controls can be simplified.

Note that the injection valves INJ may be driven with the non-valve opening energization after a predetermined period of time has passed from the completion of the driving of the fuel pump FP. In this case as well, the end of the driving of the fuel pump FP can be determined from the control information of the fuel pump drive circuit 2. Further, it can be judged from the information of a timer that a predetermined period has elapsed since the driving of the fuel pump FP was completed. Therefore, with this configuration as well, it is not necessary to compare the boosted voltage Vboost with the first threshold voltage V1 as compared with the first embodiment, so that controls can be simplified.

Third Embodiment

Next, a third embodiment will be described. Note that, in the following description, when the same reference numeral is used as in the first embodiment, the same configuration as that of the first embodiment is specified, and the preceding description is referred to unless otherwise specified. The third embodiment is different from the first embodiment in that when it is estimated that the booster circuit 3 is not operating normally based on the boosted voltage Vboost, the fuel pump is not driven and the non-valve opening energization is not performed.

Figure 7:
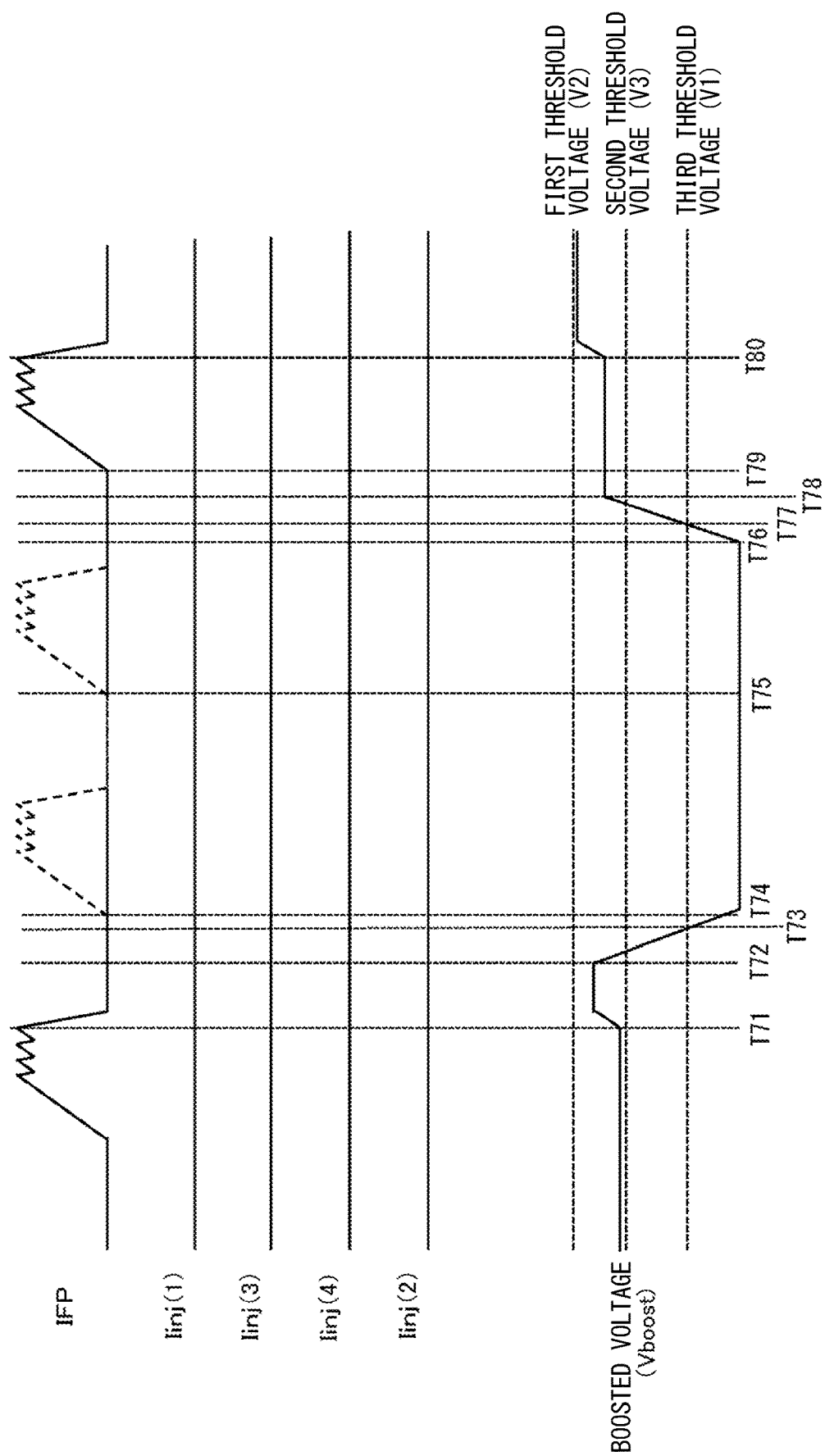
FIG. 7 is a timing chart showing an operation example of a fuel injection control device.

FIG. 7 shows a timing chart in the third embodiment. Note that the period T71-T80 shown in FIG. 7 is a stop-drive period of the injection valves. Also, the fuel pump FP has been driven prior to time T71. At time T71, when one driving cycle of the fuel pump FP is complete, energy is regenerated in the capacitor C31 of the booster circuit 3 through the diode D22, and the value of the boosted voltage Vboost rises.

In the example shown in FIG. 7, the boosted voltage Vboost decreases at time T72. This decrease of the boosted voltage Vboost can happen, for example, when the boosted voltage Vboost is supplied to a circuit other than the injection valve drive circuit 5 in an uncharged state immediately after being started, or when the charging circuit fails.

In the example of FIG. 7, the boosted voltage Vboost falls below the third threshold voltage V3 at time T73. The third threshold voltage V3 is set to a value lower than the second threshold voltage V2. This phenomenon occurs when the charge of the capacitor C31 of the booster circuit 3 is excessively discharged or when the booster circuit 3 has a failure. In such a case, the microcontroller 6 determines that the booster circuit 3 is not operating normally and sends to the fuel pump drive circuit 2 a control signal instructing to stop driving the fuel pump FP. Further, in this case, the microcontroller 6 does not perform the non-valve opening energization because the boosted voltage Vboost does not satisfy the condition for starting the non-valve opening energization.

When operating normally, at time T74 of FIG. 7, the next driving cycle of the fuel pump FP would be started as indicated by the dashed line waveform in the IFP. However, in this case, the microcontroller 6 causes the fuel pump drive circuit 2 to stop driving the fuel pump according to the control signal from the microcontroller 6. Also in this case, the microcontroller 6 does not perform the non-valve opening energization.

Further, when normally operating, the next driving cycle of the fuel pump FP would be started at time T75, as indicated by the dashed line waveform in the IFP. However, in the operation example shown in FIG. 7, at time T75, the boost voltage Vboost remains lower than the third threshold voltage V3, and therefore the fuel pump FP is not driven. Also in this case, the microcontroller 6 does not perform the non-valve opening energization.

After that, at time T76, the capacitor C31 is restored to the normal state and the boosted voltage Vboost starts to rise, and at time T77, it is assumed that the third threshold voltage V3 is exceeded. Further, at time T78, the boost voltage Vboost exceeds the second threshold voltage V2. In this case, the computer 6 sends to the control circuit 21 a control signal instructing to start driving the fuel pump FP at time T79. At time T80, the driving of the fuel pump FP ends, the energy of the fuel pump FP is regenerated to the capacitor C31 of the booster circuit 3, and the value of the boosted voltage Vboost rises.

As described above, in this embodiment, when the boosted voltage Vboost is lower than the third threshold voltage V3, the driving of the fuel pump is stopped and the non-valve opening energization is not performed. As a result, for example, it is possible to prevent an unexpected failure from occurring by not performing extra charging when the charging circuit fails.

To more clearly appreciate the technical effects associated with the embodiments in this disclosure, a comparison with a comparative example will be made. In a comparative example device, a control device for a fuel injection system including a fuel pump for compressing fuel of an internal combustion engine and an injector for injecting the compressed fuel. Energy generated in a coil of the fuel pump when the fuel pump is driven is stored in a power storage element that stores electric power used for driving the injector. The control device described in comparative example device includes a surplus power consumption circuit that consumes surplus power of the power storage element.

Here, in the comparative example device, this surplus power consumption circuit consumes the surplus power of the storage element to prevent overvoltage of the storage element. However, in order to protect the surplus power consumption circuit from excessive temperature rise due to frequent operation of the surplus power consumption circuit, it is necessary to provide periods of time in which energization of the fuel pump is prohibited to cool the surplus power consumption circuit. Further, by providing the surplus power consumption circuit, the physical size of the overall circuit is increased.

In comparison to this, the present disclosure provides a fuel injection control device that prevents the boosted voltage from exceeding the breakdown voltage of the device due to the charge accumulated in the booster circuit when the fuel pump is driven. Specifically, according to the present disclosure, the non-valve opening energization is performed at an energy level at which the injection valves do not open. According to this, the electric charge accumulated in the booster circuit can be discharged while continuing the driving of the fuel pump. Therefore, it is possible to prevent the occurrence of a defect in the device due to the boosted voltage exceeding the breakdown voltage of the components.

Other Embodiments

The disclosure in this specification and drawings is not limited to the exemplified embodiments. The disclosure includes the exemplified embodiments and variations thereof by those skilled in the art based thereon. For example, the disclosure is not limited to the combinations of components and/or elements shown in the embodiments. The disclosure may be implemented in various combinations. The disclosure may have additional parts that can be added to the embodiments. The disclosure includes those in which parts and/or elements of the embodiments are omitted. The disclosure encompasses the replacement or combination of components and/or elements between one embodiment and another. The disclosed technical scope is not limited to the description of the embodiments. It should be understood that some disclosed technical ranges are indicated by description of claims, and includes every modification within the equivalent meaning and the scope of description of claims.

In each of the above-described embodiments, the example in which the control process shown in the flow charts of FIGS. 4 and 6 is executed by the microcontroller 6 is shown, but the control process is not limited to this. For example, all or part of the control processes shown in FIGS. 4 and 6 may be implemented by all or part of the control circuit 21, the control circuit 31, the control circuit 51, and the control circuit 52.

Moreover, in each of the above-described embodiments, the case where a transistor is used as a switch of each unit is illustrated. However, other switching elements, such as analog switches, may be used instead of transistors.

Further, the control circuits 21, 31, 51, 52 of the above-described respective embodiments may be implemented as one or a plurality of control devices. For example, the control devices may include a memory and a processor that executes a program stored in the memory. Further, for example, the control device may include a logic circuit including a digital circuit including a number of programmed logic units (gate circuits).

The invention claimed is:

1. A fuel injection control device, comprising:
    an injection valve drive circuit that drives a plurality of injection valves;
    a booster circuit that generates a boosted voltage supplied to the injection valve drive circuit; and
    a fuel pump drive circuit that drives a fuel pump for compressing fuel of an internal combustion engine, wherein
    the fuel pump drive circuit is configured to, when driving the fuel pump, regenerate energy into the booster circuit, and
    the injection valve drive circuit is configured to, during a non-drive period of the injection valves or during a period in which the fuel pump is intermittently driven continuously, perform a non-valve opening energization on at least one of the plurality of injection valves.

2. The fuel injection device of claim 1, further comprising:
    a boosted voltage monitor circuit that measures the boost voltage, wherein
    the injection valve drive circuit is configured to:
        start the non-valve opening energization when the boosted voltage measured by the boosted voltage monitor circuit reaches or exceeds a first threshold voltage, and
        stop the non-valve opening energization when the boosted voltage reaches or falls below a second threshold voltage, the second threshold voltage being lower than the first threshold voltage.

3. The fuel injection device of claim 2, wherein
    the non-valve opening energization and the driving of the fuel pump are stopped when the boosted voltage measured by the boosted voltage monitor circuit falls below a third threshold voltage, the third threshold voltage being lower than the second threshold voltage and indicating an abnormality in the operation of the booster circuit.

4. The fuel injection device of claim 1, wherein
    the injection valve drive circuit is configured to start the non-valve opening energization after detecting that the driving of the pump is completed based on a control signal from the fuel pump drive circuit to the fuel pump.

5. The fuel injection device of claim 1, wherein
    the injection valve drive circuit is configured to perform the non-valve opening energization sequentially on all of the plurality of injection valves.

6. The fuel injection device of claim 1, wherein
    the injection valve drive circuit is configured to stop the non-valve opening energization when a current supplied to at least one of the plurality of injection valves due to the non-valve opening energization reaches a predetermined value.

7. The fuel injection device of claim 1, wherein
    the injection valve drive circuit is configured to stop the non-valve opening energization after a predetermined time has elapsed from the start of the non-valve opening energization.

* * * * *